United States Patent
Lanou, Jr.

(10) Patent No.: US 6,213,254 B1
(45) Date of Patent: Apr. 10, 2001

(54) AIR-BRAKE ROD TRAVEL INDICATOR

(76) Inventor: Vernon L. Lanou, Jr., 42 Hog Hill Rd., East Hampton, CT (US) 06424-1821

( * ) Notice: Subject to any disclaimer, the term of this patent is extended or adjusted under 35 U.S.C. 154(b) by 0 days.

(21) Appl. No.: 09/498,547

(22) Filed: Feb. 4, 2000

Related U.S. Application Data

(60) Provisional application No. 60/119,055, filed on Feb. 8, 1999.

(51) Int. Cl.[7] ........................................ F16D 66/02
(52) U.S. Cl. ...................................... 188/1.11 W; 116/208
(58) Field of Search ..................... 188/1.11 R, 1.11 W, 188/79.51, 79.55; 116/208

(56) References Cited

U.S. PATENT DOCUMENTS 4,279,214 * 7/1981 Thorn .............................. 188/1.11 W
6,019,197 * 2/2000 Judson ........................... 188/1.11 W

* cited by examiner

*Primary Examiner*—Christopher P. Schwartz

(57) ABSTRACT

An Air Brake Travel Rod Indicator (ABTRI) is disclosed which indicates a brake adjustment is needed by measuring the amount of movement of a brake rod between an air can and an indicator arm of the ABTRI when the air brake is applied. The ABTRI is comprised of a resilient material having a sleeve cut out so that it may be pressed onto the brake rod. An indicator arm or pointer is formed integral with the sleeve and projects perpendicular therefrom.

1 Claim, 1 Drawing Sheet

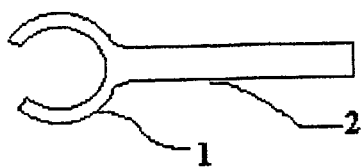
Figure #1: Top View
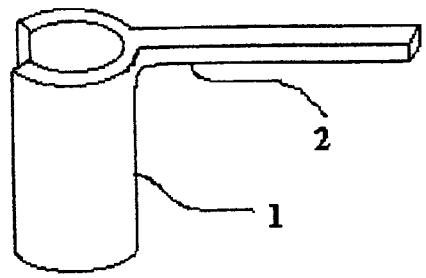
Figure #2: Side View
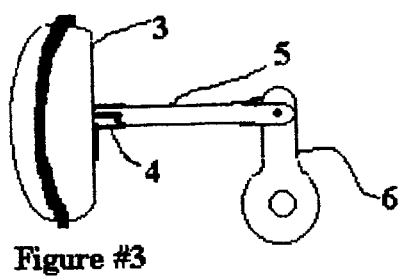
Figure #3
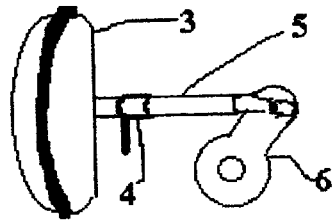
Figure #4

AIR-BRAKE ROD TRAVEL INDICATOR

This application claims the benefit of U.S. Provisional No. 60/119,055 filed Feb. 8, 1999.

BACKGROUND

1. Field of Invention

This Invention pertains to truck air-brakes and is used to indicate brake adjustment.

2. Description of Prior Art

The Federal Government of The United States has regulations requiring the inspection of air brakes on applicable trucks to ensure that the adjustment on the brake is within the guidelines.

Therefore spot-checks are made by Federally approved inspectors to ascertain whether adjustment is necessary.

Joseph W. Thorn's U.S. Pat. No. 4,279,214: Brake Wear Indicator, is an example of a tool which may be used to check the amount of adjustment required, however it appears to have several flaws with regard to over-complex design and cost prohibits, whereas my invention solely indicates that the brake may or may not need adjustment.

The aforementioned Brake Wear Indicator goes too far and attempts to indicate the amount of wear on brake components. Because of this it seems to be, at least, overtstated for Federal requirements.

It would appear that although the idea to install a sleeve on the brake rod to enter the aperture on the Brake Can is a good one, it does seem impractical with regard to accuracy because the sleeve, with wear indicator markings, is slack-fit and the air brake rod does not provide a true path in and out of the air can. This could cause the sleeve to slip and/or not return through the aperture in the air can once the brake is released. Also the markings or color codes may prove impractical with regard to readings, because of the frequent occasion for dirt, grime or mud to collect on the sleeve.

OBJECTS AND ADVANTAGES OF THE INVENTION

Simply, my Air-Brake Rod Travel Indicator(ABRTI) will indicate any adjustment needed on the brakes by the amount of movement of the brake rod being measured between the air can and the ABRTI Indicator Arm, giving a clear and precise reading every time a check is done.

This is accomplished either by a visual inspection or, if absolutely necessary, using a basic tape or rule if there is any doubt as to compliance with regulations. The check can be done at any time, either by an on road inspection or a quick inspection before the truck leaves its place of business. At that time any adjustment could be carried out before the truck goes on the road.

BRIEF DESCRIPTION OF THE DRAWINGS

FIG. 1 shows a top overhead view of the ABRTI with 1. the open sleeve which affixes to the brake rod and 2. the indicator arm.

FIG. 2 shows a side view of 1. the sleeve as described in FIG. 1 and 2. the indicator arm as described in FIG. 1.

FIG. 3 shows 4. the complete and positioned AIRBRAKE ROD TRAVEL INDICATOR (ABRT) 3. the Air Can, 5. the Brake Rod with ABRTI affixed and 6. the Slack Adjuster, affixed to the Brake Rod.

FIG. 4 shows and indicates 3. the face of the Air Can, 4. the ABRTI shown on the Brake Rod with brake applied and 6. the Slack Adjuster to show travel.

DETAILED DESCRIPTION OF THE DRAWINGS

1 ABRTI Sleeve
2 ABRTI Indicator Arm
3 Air Can
4 Complete ABRTI
5 Brake Rod
6 Slack Adjuster The ABRTI incorporates an indicator of resilient molded material which is manually clipped by thumb pressure onto an Air-brake Rod and allows the visual measurement of adjustment necessary depending on the amount of travel when the brake is applied.

The Air-Brake Rod Travel Indicator(ABRTI) comprises of a one-piece molded instrument of durable material for measuring the travel of the brake rod.

OPERATION AS SHOWN IN FIG. 3 AND FIG. 4

FIG. 3 and FIG. 4 show the operation of the aforementioned abrti AS ATTACHED TO THE air Brake Rod. The Indicator Arm is flush with the face of the Air Can and when the brake is applied the Brake Rod extends outwardly and allows the Slack Adjuster to rotate, applying brake; thus the amount of travel the ABRTI makes from the Air Can face indicates the amount of adjustment needed or whether the distance traveled is in compliance with Federal Regulations. This is done before the brake is released. Hence, adjustment can be easily made by an on-site technician or qualified driver, before road use.

CONCLUSIONS, RAMIFICATIONS AND SCOPE

Therefore, with an absolute minimum of cost of production, the problem of measuring with certainty, the amount of travel on an air brake rod to keep it within Federal Safety Regulation Guidelines is solved within the scope of my invention.

Because the aforementioned ABRTI is of a resilient material and basic white with no nooks or crannies for dirt or grime to gather and with no danger of discoloration it makes for easy reading every time with, at most, a wipe of the area with a damp rag.

I claim:

1. An Air-Brake Rod Travel Indicator, (hereafter ABRTI), said ABRTI is of durable, resilient material having an opening on a sleeve cut to fit neatly and clip easily onto an air-brake rod, said ABRTI having an appendage indicator arm or pointer, formed with and perpendicular to the said sleeve said indicator arm or pointer to be contiguously fitted against the face of an Air Can which has an aperture to accomodate said air-brake rod so that said air brake rod protrudes from said Air Can to a Slack Adjuster at an opposite end of said rod so that when an air-brake is applied on an air-brake system it will cause said air-brake rod to move, whereby the amount of movement of the brake rod will be indicated by the indicator arm of the said ABRTI to determine whether any brake adjustment is needed by measuring an adjustment gap from the said Air Can to the said indicator arm of the Said ABRTI on the said Air-brake Rod and determining if said gap is within Federal Safety Regulation Guidelines.

* * * * *